(No Model.)  2 Sheets—Sheet 1.
W. T. EBERT.
TRAP.
No. 603,479.  Patented May 3, 1898.
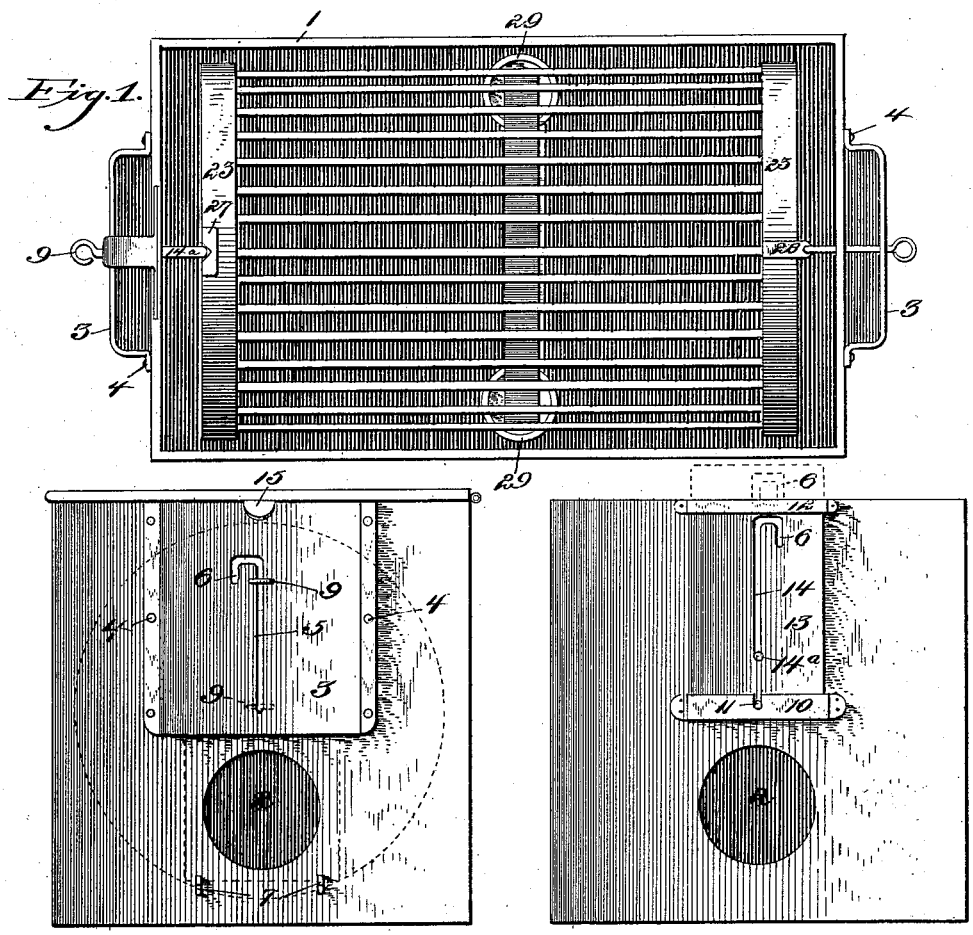
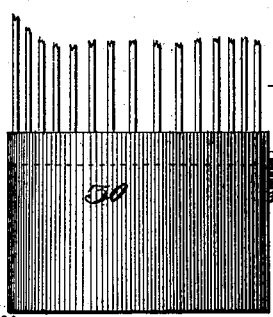
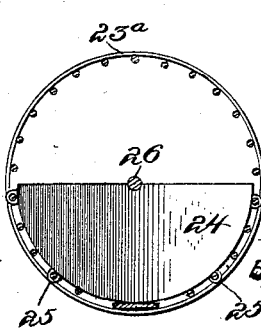
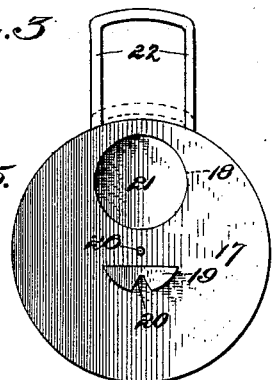
Witnesses
J. P. Appleman
A. M. Wilson
Inventor
William T. Ebert.
By Henry C. Evert
Attorney (No Model.) 2 Sheets—Sheet 2.

W. T. EBERT.
TRAP.

No. 603,479. Patented May 3, 1898.

Witnesses
Frank H. Stright.
A. W. Wilson

Inventor
William T. Ebert.
By Henry C. Evert, Attorney

UNITED STATES PATENT OFFICE.

WILLIAM T. EBERT, OF OAKLAND, PENNSYLVANIA.

TRAP.

SPECIFICATION forming part of Letters Patent No. 603,479, dated May 3, 1898.

Application filed April 8, 1897. Serial No. 631,304. (No model.)

*To all whom it may concern:*

Be it known that I, WILLIAM T. EBERT, a citizen of the United States of America, residing at Oakland, in the county of Allegheny and State of Pennsylvania, have invented certain new and useful Improvements in Traps, of which the following is a specification, reference being had therein to the accompanying drawings.

This invention relates to certain new and useful improvements in animal-traps, and has for its object to construct a device which can be easily operated and prevent the animal from escaping.

The invention further aims to provide a device which will be simple of construction, strong, efficient, and comparatively inexpensive to manufacture.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, wherein like figures of reference indicate similar parts throughout the several views, in which—

Figure 7:
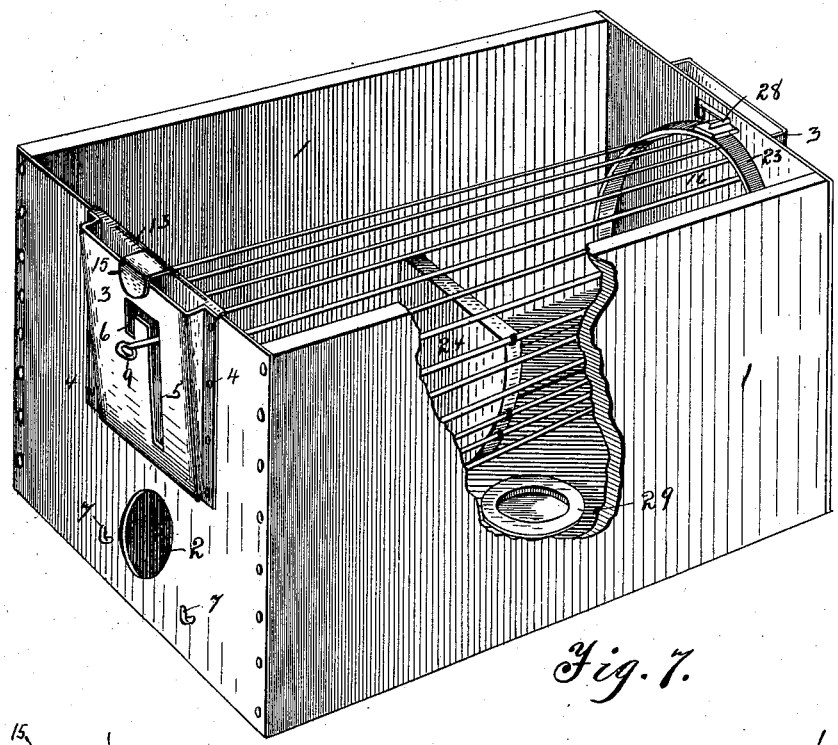
Figure 8:
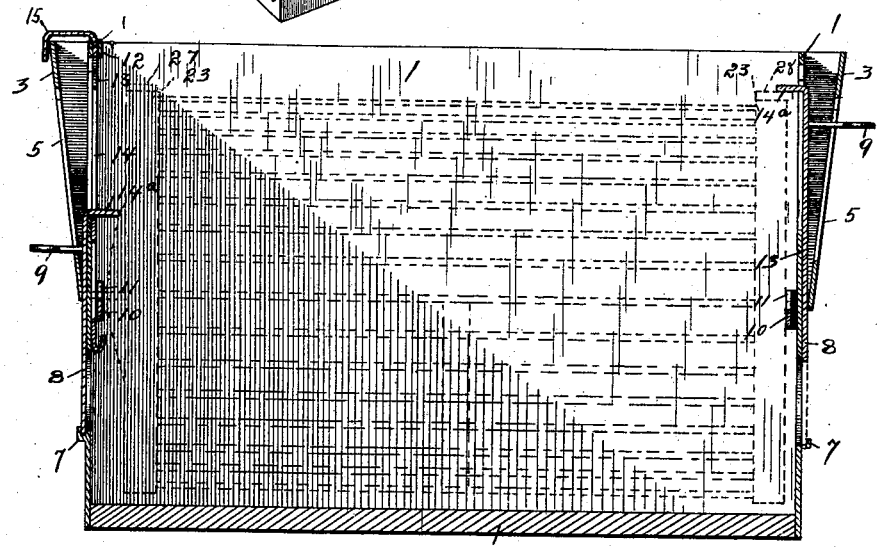

Figure 1 is a top plan view of my improved trap. Fig. 2 is a view of one end. Fig. 3 is a view of the same looking at the inside. Fig. 4 is a sectional view of the cage, showing means for securing the partition in position. Fig. 5 is an end view of the cage, showing means for closing the openings. Fig. 6 is a side elevation of cup and part of cage. Fig. 7 is a perspective view of my improved trap, showing part cut away. Fig. 8 is a longitudinal sectional view showing the cage in dotted lines.

Referring now to the drawings, 1 designates the case or box, provided with openings 2 to allow the animal to enter the trap. Secured to the outside of the case or box 1 is a shield 3. Said shield is secured in any suitable manner, as shown at 4. The shield is also provided with an upwardly-extending slotted guideway 5, terminating in an angular support 6. The body is provided with lugs 7, adapted to support a door 8, operating inside the shield 3. Secured to the sliding door is a lug 9, operating in the guideway 5 and engaging the support 6. Secured to the inside of the box or case is a support 10, provided with a slot 11. Secured at or near the top of the case is a guide 12, adapted to form a guideway for slide 13, and said slide is provided with a guideway 14, engaging the lug $14^a$, carried by the inside of the door 8. The slide 13 is also provided with a projection 15, by which the slide 13 is operated.

Revolubly mounted in the box or case is a cage 16, having heads 17, said heads provided with openings 18. Secured to the outside of the cage is a plate 19, provided with a notch 20, adapted to engage the lug $14^a$ of the plate 8 to prevent the cage from rotating.

Slidably mounted on the inside of the cage is a door 21, having a handle 22. The arms of said handle pass through openings in the band 23 of the cage. The partition 24 is secured to the wires of the cage by means of the staples 25, which permit it to be adjusted toward either end. Said partition supports the spindle 26, the ends of which engage the slots 11 of the braces 10.

The band 23 carries the tripping mechanisms 27 and 28, which support the lugs $14^a$ when the trap is set.

The operation is as follows: After the cage has been placed inside the the box, the shaft 26 engaging the notch 20 of the support 19, the doors are set by supporting the same on the bands 23, which are provided with tripping mechanisms 27 and 28. As the animal enters the trap the cage is tilted, causing the tripping mechanism to disengage the lugs $14^a$ from the bands 23, when the doors close by their own weight. When the animal is to be removed, the cage is rotated until the side diagonally opposite from the tripping mechanism is brought to the top, when the handles are pulled out, which closes the openings in the case with the doors 21, when the cage can be removed from the box.

It will be noted that various changes may be made in the details of construction without departing from the general spirit of my invention.

Having fully described my invention, what I claim as new, and desire to secure by Letters Patent, is—

1. In an animal-trap, a case, a revolving cage mounted in said case carrying tripping mechanism, sliding doors carried by said case and provided with lugs engaging the tripping mechanism, and means for closing the openings in said revolving cage, substantially as shown and described.

2. In an animal-trap, a case provided with openings, sliding doors secured to the outside of said case and provided with lugs, a revolving cage provided with openings, mounted on the inside of said case, carrying tripping means adapted to engage lugs carried by the sliding doors, sliding doors carried by the cage and adapted to close the openings, substantially as shown and described.

3. In combination, a case provided with openings, shields secured to said case, carrying sliding doors, a revolving cage, provided with openings, and carrying tripping means adapted to engage lugs carried by said sliding doors, and means for closing the openings in said cage, substantially as shown and described.

In testimony whereof I affix my signature in presence of two witnesses.

WILLIAM T. EBERT.

Witnesses:
W. H. TIMMERMANN,
GEO. B. PARKER.